May 4, 1948.  S. W. ALDERFER  2,441,094

VALVE

Filed Oct. 5, 1943

INVENTOR
STERLING W. ALDERFER

BY Ely T. Frye

ATTORNEYS

Patented May 4, 1948

2,441,094

UNITED STATES PATENT OFFICE 2,441,094

VALVE

Sterling W. Alderfer, Akron, Ohio, assignor of one-half to Edward D. Andrews, Akron, Ohio Application October 5, 1943, Serial No. 505,072

4 Claims. (Cl. 251—40)

The present invention relates to the construction of valves and valve release devices, and while it may have utility in other fields, it is primarily intended and adapted for use on tanks holding compressed or liquefied gases used in conjunction with inflatable boats or similar devices, fire extinguishers and the like.

In the usual or standard type of valve mechanisms of this character, the valve proper is operated by a plunger which is threaded in the valve body. Frequently these devices will stick or become frozen, making it hard to turn the release mechanism. Also, the valve is more often used in an emergency and the operator will in the confusion and excitement turn the valve the wrong way and jam it. As life may depend upon instantaneous action, this is a serious fault in prior valve constructions.

The object of the invention is to provide a valve construction which can be released immediately under any conditions. The arrangement is such that the operator will instinctively do the correct thing to release the valve at once and the valve will be instantly opened. The device is simple and effective and cannot get out of order or become clogged or frozen.

With the valve is associated a safety lock which prevents accidental opening of the valve, and this lock is associated with a jerk cord so that in one movement the operator can release the lock and open the valve. Also associated with the valve body is a safety release which will rupture if the pressure within the tank or bottle rises to a point which might cause it to explode.

In the drawings in which the best known and preferred form of the invention is illustrated:

Figure 1:
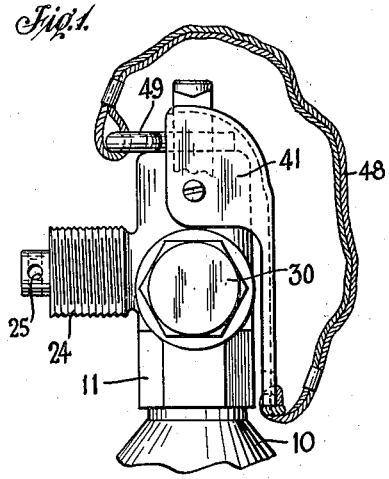
Fig. 1 is a side view of the valve in closed position.

In the drawings, the numeral 10 is applied to the outlet of the tank or bottle in which the compressed or liquefied gas is stored and 11 is the main valve body fastened to the outlet. In the valve body immediately above the outlet is formed the valve chamber 12, the other side of which is provided with the valve seat 14 formed with a depending lip which makes fluid-tight contact with the gasket or packing 15 carried on the lower end of the movable valve member 16 and confined by the cap 18. The pressure within the container will hold the valve raised and closed until it is forcibly depressed by the means to be described.

Above the valve seat is located a second chamber or passage 20 from which is extended the lateral discharge passage 22, through the coupling or nipple 24 which is fastened in the boat or other inflatable device. The passage 22 terminates in cross-passages 25 which will direct the outwardly flowing gas away from the opposite wall of the article to be inflated.

From the chamber 12 extends the relief opening 27, the outer end of which is normally closed by a disk 28 held in position by a screw-threaded hollow plug 30 having relief ports 31. The disk 28 is designed so that if the pressure within the bottle or container reaches the danger point, the disk 28 will rupture and avert explosion of the container.

The valve pin 16 is extended upward and received and guided in a passage 33 located in the operating plunger 34 which is guided in a screw-threaded closure plug 35 beneath which is located the packing 36. The upper end of the plunger is formed with two oppositely placed kerfs or grooves 38 which are designed to receive the cam lever by which the plunger is raised or lowered. As shown in the drawings, each groove is made by two opposed substantially V-shaped cuts so that centrally located, opposed points 38 and 39 are provided to ride upon the operating surfaces of the cam lever.

The cam lever referred to is designated by the numeral 40 and is formed with a central web 43 and with two wings 41 by which it is pivoted to the sides of the valve body as at 42. The web or body of the lever is formed on an arc diverging from the center 42 and is provided with a slot 44 to embrace the plunger so that the coaction of the web with the surfaces 38 and 39 will raise the plunger when the lever is in the position shown in Fig. 1, but will depress it to open the valve when the lever is lifted as shown in Fig. 2. The operating end of the lever will lie alongside the valve body when the valve is closed and is provided with an eye 46 in which is received one end of an operating pull-cord 48, the other end of which is attached to a pin 49 which, when the valve is closed, is received in a transverse opening 50 in the plunger located just above the upper wall of the valve body. This pin serves as a safety device to prevent accidental opening of the valve.

Figure 2:
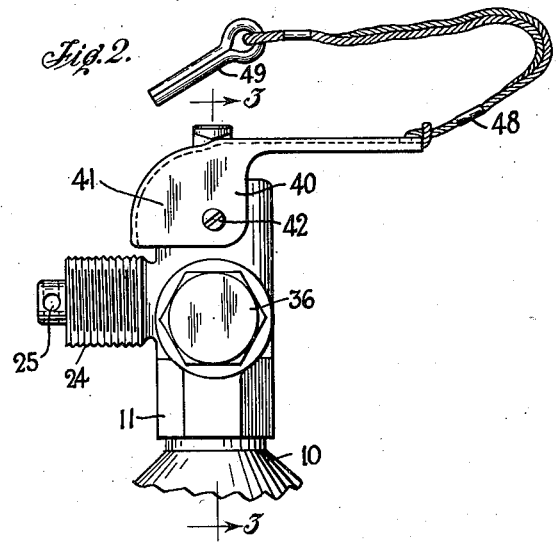
Fig. 2 is a similar view with the valve open.
Figure 3:
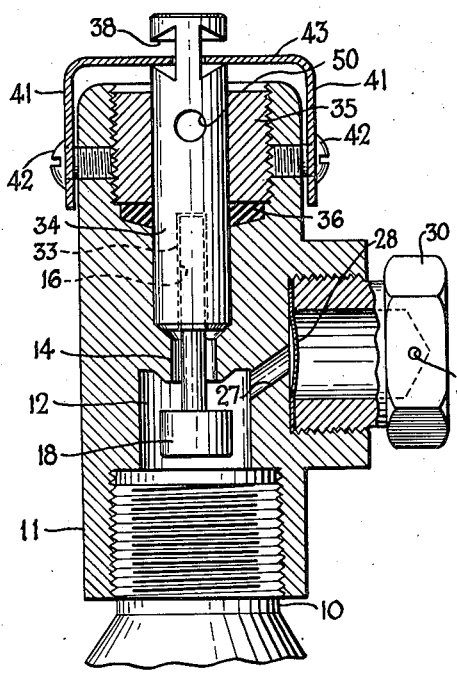
Fig. 3 is a section on the line 3—3 of Fig. 2, but somewhat enlarged.
Figure 4:
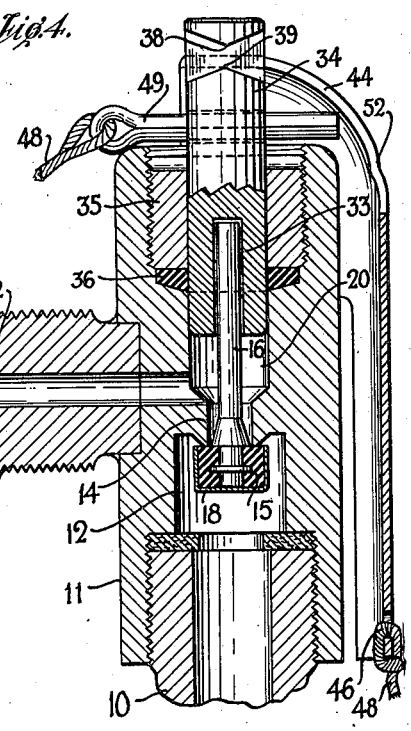
Fig. 4 is a section taken at right angles to the section of Fig. 3.

It will be noted that in the closed position illustrated in Fig. 1, the cam lever is slightly past center so that the lever will tend to remain in closed position. It will also be noted that the curved surface of the lever is provided with a depression 52 in which the formation 38 will seat when the valve is opened and thus the valve is prevented from accidental closing.

When the valve is to be opened, the operator seizes the pull-cord which forms a convenient loop, pulls out the pin 49 and then with a continuation of the movement raises the cam lever 40 and opens the valves. The pin may be inserted from the direction opposite to that shown in the drawings, but the position illustrated is preferred.

It will be seen that the valve is operated in an instant and that the cam lever will move the valve to fully opened position immediately if desired. Also, the force exerted by the cam lever is sufficient to overcome any sticking of the valve. There are no screw-threads to become corroded or frozen and the valve will not stick or fail to open for any of the reasons which often prevent the immediate operation of the standard types of valves.

While the description of the improved valve has been in great detail, it is apparent that changes and modifications may be made therein without departure from the invention as set forth in the appended claims.

What is claimed is:

1. In a device of the character described, a valve body having a valve chamber, a valve seat in one wall of the valve chamber, a floating valve adapted to be held against the seat by the pressure acting on the valve, said valve having a stem portion, a plunger in the valve body, said plunger having a recess to receive the stem portion of the valve, a lever pivotally mounted on the valve body, said lever having a cam surface engaging the end of the plunger which projects above the valve body, a safety device to lock the plunger in raised position when the valve is closed, a pull cord connected to the lever and the safety device, and a detent formation on the lever to engage the plunger when the valve is open.

2. In a device of the character described, a valve body having a valve chamber, a valve seat in one wall of the valve chamber, a floating valve adapted to be held against the seat by pressure acting on the valve, said valve having a stem portion, a plunger in the valve body contacting the stem portion, a lever pivotally mounted on the valve body, said lever having a cam surface which is eccentric to its pivot point and is located between opposed surfaces on the plunger, whereby rocking of the lever will move the valve toward and away from its seat, a safety device to lock the plunger in valve-closed position, and a pull cord connected to the end of the lever and to the safety device.

3. In a valve construction, a valve body having a valve chamber, a valve seat in the chamber, a valve adapted to be held against the valve seat by pressure on the valve, means to move the valve from its seat comprising a plunger slidably mounted in the valve body, the inner end of the plunger contacting the valve and its outer end projecting outside of the valve body, an operating lever pivoted on the valve body, the main portion of the lever lying alongside the valve body when the valve is closed, said lever having a surface eccentric to the pivot and in engagement with the outer end of the plunger, a removable locking pin engaging the plunger, and a pull cord, the ends of which are connected to the pin and to the lever.

4. In a valve construction, a valve body having a valve chamber, a valve seat in the chamber, a valve adapted to be held against the valve seat by pressure on the valve, means to move the valve from its seat comprising a plunger slidably mounted in the valve body, the inner end of the plunger contacting the valve and its outer end projecting outside of the valve body, an operating lever, said lever having parallel wings which are located on opposite sides of the valve body and pivoted thereon, said lever also having a web portion which is eccentric to the pivots and in contact with the plunger, and an operating arm which lies along the valve body when the valve is closed, a removable locking pin engaging the plunger, and a pull cord, the ends of which are connected to the pin and to the lever.

STERLING W. ALDERFER.

REFERENCES CITED

The following references are of record in the file of this patent:

UNITED STATES PATENTS

| Number | Name | Date |
| --- | --- | --- |
| 285,953 | Barr | Oct. 2, 1883 |
| 408,124 | Michaud | July 30, 1889 |
| 1,369,877 | Beck | Mar. 1, 1921 |
| 1,454,367 | Yardley | May 8, 1923 |
| 1,669,650 | Bloch | May 15, 1928 |
| 1,772,674 | Markus | Aug. 12, 1930 |
| 2,208,490 | Axtell | July 16, 1940 |
| 2,272,132 | Schaaf | Feb. 3, 1942 |
| 2,342,635 | Barber | Feb. 20, 1944 |

FOREIGN PATENTS

| Number | Country | Date |
| --- | --- | --- |
| 10,012 | Great Britain | 1893 |